(12) United States Patent
Hannebauer et al.

(10) Patent No.: US 6,675,952 B1
(45) Date of Patent: Jan. 13, 2004

(54) LUMBER BIN

(75) Inventors: James B. Hannebauer, Salmon Arm (CA); Clifford B. Davies, Salmon Arm (CA)

(73) Assignee: Mill Tech Industries, Salmon Arm (GB)

( * ) Notice: Subject to any disclaimer, the term of this patent is extended or adjusted under 35 U.S.C. 154(b) by 0 days.

(21) Appl. No.: 10/307,334

(22) Filed: Dec. 2, 2002

(51) Int. Cl.[7] ................................................ B65G 47/19
(52) U.S. Cl. ........................ 198/532; 198/367; 198/530; 414/266
(58) Field of Search ............................. 198/347.1, 347.4, 198/367, 530, 532, 562; 414/266

(56) References Cited

U.S. PATENT DOCUMENTS 1,472,054 A * 10/1923 Drake ......................... 198/532
1,925,990 A * 9/1933 Pampel ....................... 198/532
3,913,744 A * 10/1975 Turner et al. ................ 198/367
4,871,059 A * 10/1989 Rantanen et al. ........... 198/532
6,513,645 B2 * 2/2003 Spatafora et al. .......... 198/347.1

FOREIGN PATENT DOCUMENTS

CA          1264772          9/2002

* cited by examiner

*Primary Examiner*—James R. Bidwell
(74) *Attorney, Agent, or Firm*—Oyen Wiggs Green & Mutala

(57) ABSTRACT

A lumber bin has live bin walls. The lumber bin may be used in lumber sorting. The bin has upstream and downstream walls located above a conveyor. A lumber support in the bin has an elevator mechanism and can be lowered to a discharge position in which lumber on the lumber support can be carried away by the conveyor. A gate is mounted below the conveyor. The gate is in an upright position as the lumber support is lowered. The gate can be pivoted downstream to a lowered position below a level of the conveyor to gently discharge lumber onto the conveyor.

16 Claims, 12 Drawing Sheets

LUMBER BIN

TECHNICAL FIELD

The invention relates to bins for holding lumber. The application has specific application to bins for holding sorted lumber.

BACKGROUND

Lumber bins with so-called "live bin walls" are used for holding lumber in various places in sawmills. A series of such bins may be used, for example, to hold various grades of sorted lumber. Canadian patent No. 1,264,772 discloses a bin sorter having bins separated by bin walls. Each bin has a floor which can be lowered to a lumber discharge station. A gate extends from the bottom of each wall. The gates function to control the discharge of lumber from individual bins onto a conveyor.

When lumber is discharged from a bin of the type described in Canadian patent No. 1,264,772, the lumber sometimes spills onto the conveyor in a way that can damage the lumber.

There is a general need for lumber bins which can effectively hold quantities of lumber and then discharge the lumber, when desired. There is a particular need for such bins which reduce damage to the lumber during discharge of the lumber.

SUMMARY OF THE INVENTION

The invention relates to bins for holding lumber and methods for operating lumber bins. One aspect of the invention provides a lumber handling apparatus. The apparatus may be a bin sorter apparatus. The apparatus comprises upstream and downstream bin walls having lower edges and a conveyor extending below lower edges of the upstream and downstream bin walls. The conveyor is movable in a downstream direction. A lumber support is located between the bin walls. The lumber support movable upwardly and downwardly between a first position wherein the lumber support is between the bin walls and a discharge position wherein a lumber supporting surface of the lumber support is below the lower edge of the downstream bin wall. A first gate is movable between an upright position wherein the first gate projects above the level of the conveyor to substantially block lumber from passing between the lower end of the downstream bin wall and the conveyor and a lowered position wherein the first gate is below the level of the conveyor. Lumber can be discharged by lowering the lumber support to the discharge position and then lowering the gate so that the lumber is carried over the lowered gate by the conveyor.

The first gate may be pivotally mounted to a support for rotation about a pivot axis below the level of the conveyor.

Another aspect of the invention provides a method for operating a lumber handling apparatus. The apparatus comprises a bin having upstream and downstream bin walls. The method comprises placing a quantity of lumber on a downwardly movable lumber support surface in the bin between the bin walls and moving a gate to an upright position. In its upright position the gate substantially blocks a gap between a conveyor and a lower edge of the downstream bin wall. The method lowers the lumber support to a discharge position and moves the gate downwardly to a lowered position below a level of the conveyor. The method then carries the lumber on the conveyor downstream from the lumber support and over the gate.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
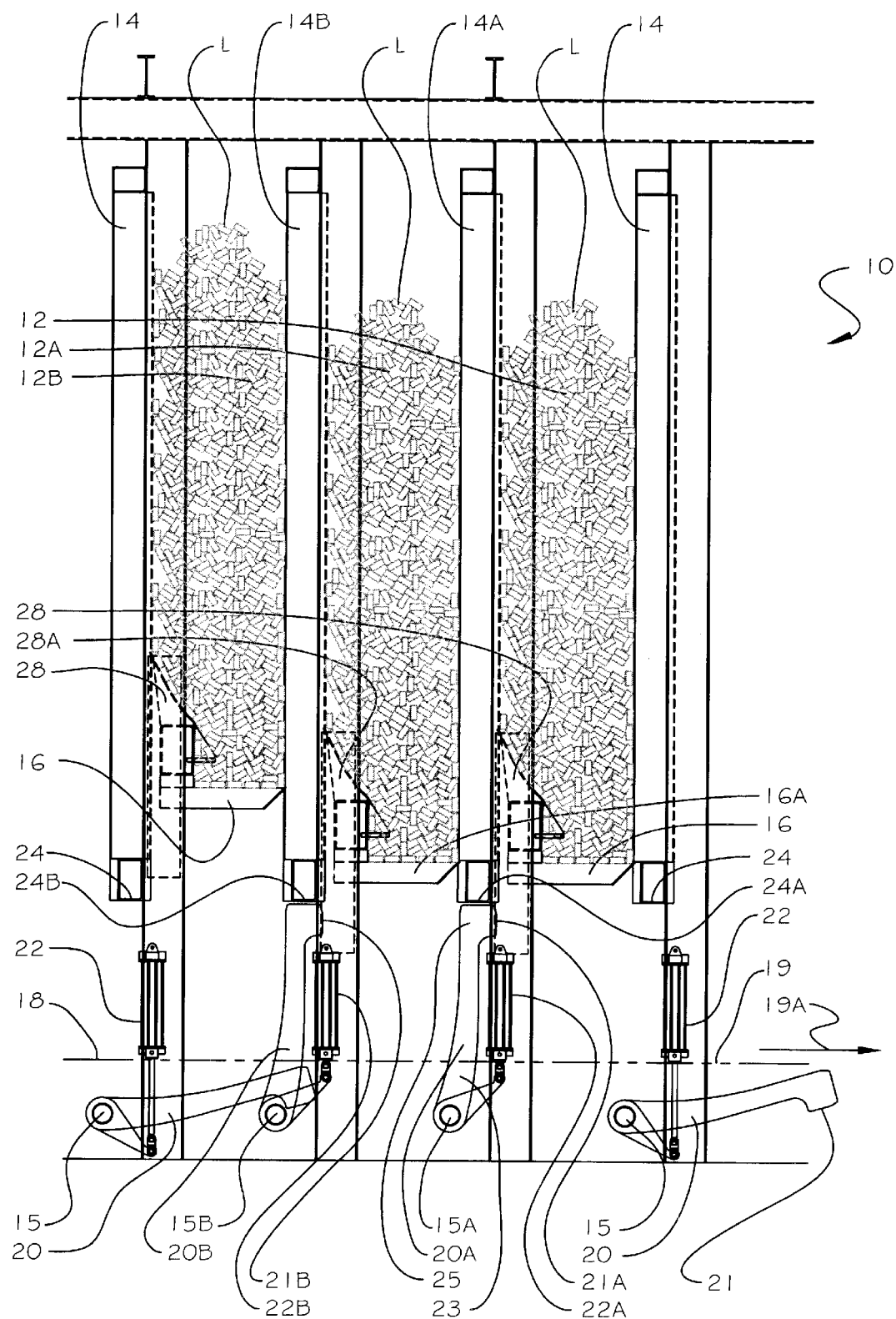
FIG. 1 is a partially schematic side elevational view of a series of lumber sorting bins according to one embodiment of the invention.
Figure 3:
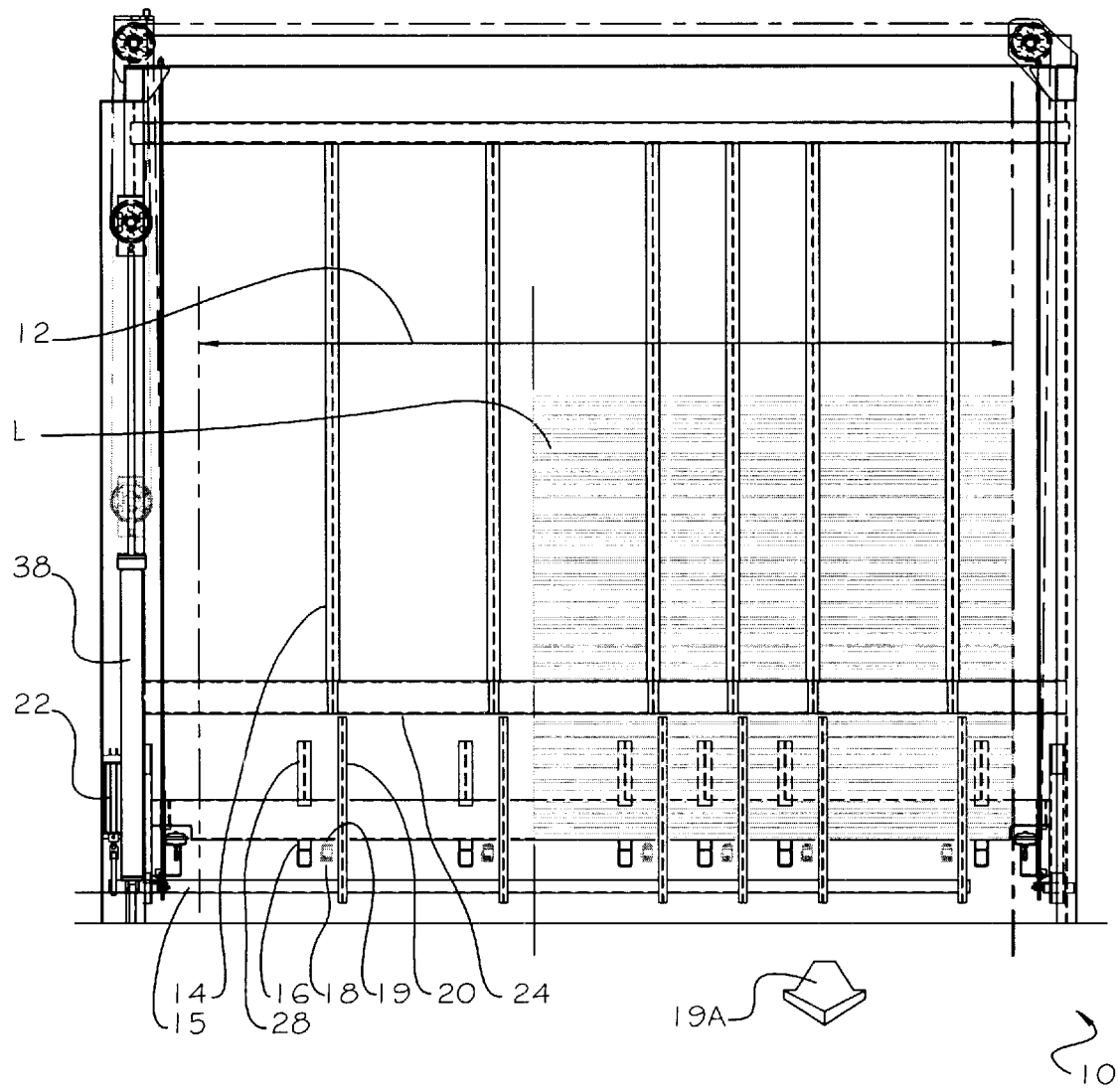
FIG. 3 is a transverse cross sectional view through a wall of one of the bins of the lumber sorting bins of FIG. 1.

FIG. 1 shows a portion of a bin sorter 10 according to one embodiment of the invention. Sorter 10 has a number of lumber bins 12. Each bin 12 is defined between a pair of walls 14. A lumber support 16 supports an amount of lumber L within the bin. Lumber support 16 may be raised or lowered by a suitable elevator mechanism (not shown). A conveyor 18 extends below bins 12. Conveyor 18 may, for example, comprise a set of parallel spaced apart floor chains 19 which slide in suitable guideways 32 (see FIG. 3) in the direction of arrow 19A. The details of construction of conveyor 18 are not material to this invention. Any suitable conveyor may be used.

Figure 2A:
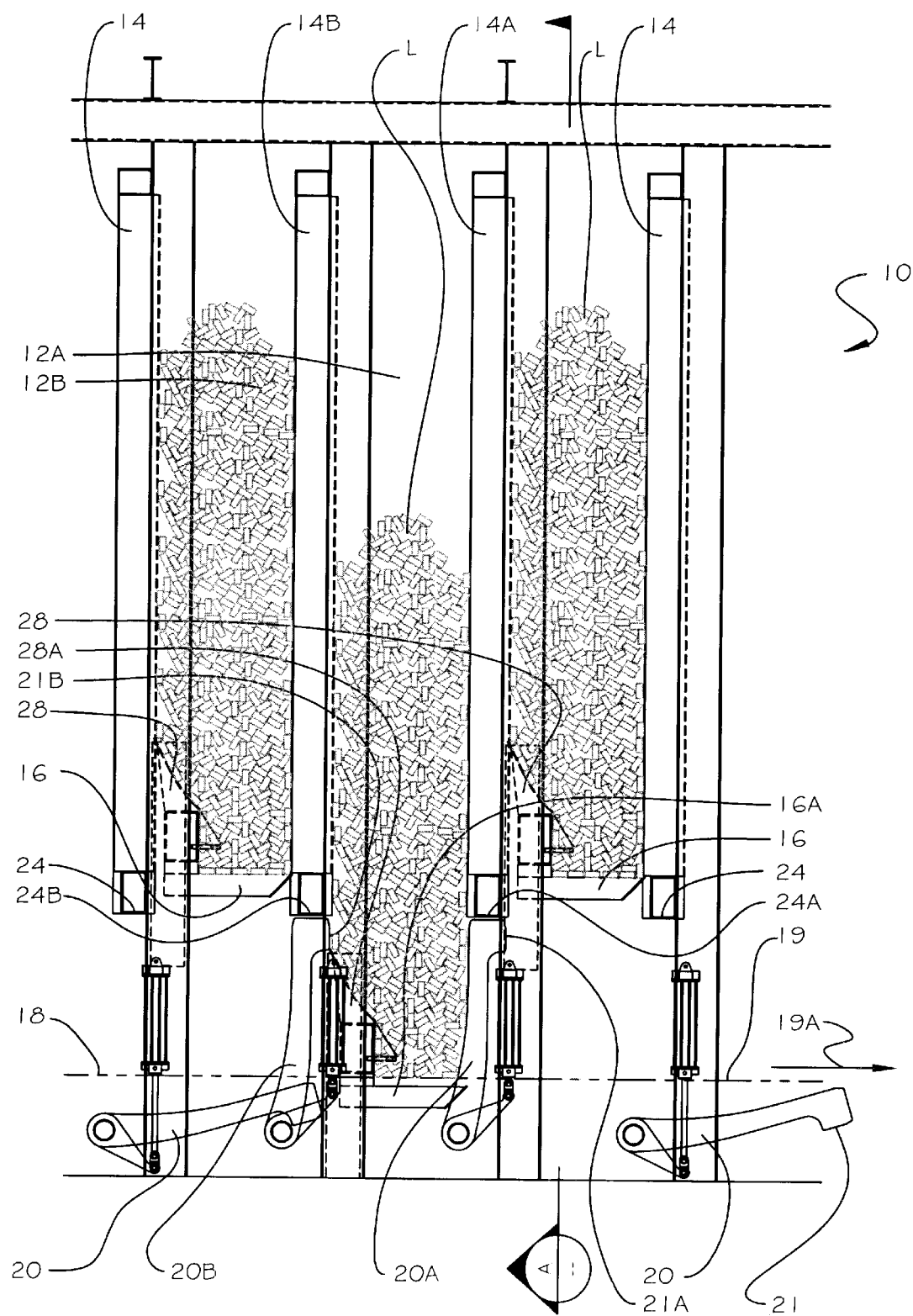
FIG. 2A is a side elevation of the lumber sorting bins of FIG. 1 in a first stage of a lumber discharge cycle.

Lumber L from any selected one of bins 12 may be placed onto conveyor 18 by lowering the lumber support 16 of the selected bin into a discharge position. In FIG. 2A, lumber support 16 of bin 12A has been lowered to its discharge position. In the discharge position, lumber support 16 is below the level of conveyor 18 so that the lowermost pieces of lumber in bin 12A are resting on chains 19 of conveyor 18.

A gate comprising a set of bin arms 20 extends upwardly from below conveyor 18 below each wall 14. Bin arms 20 can be positioned to project upwardly between the chains (or other conveyor elements) of conveyor 18. Bin arms 20 are pivotally actuated by actuators 22. The gate may comprise a row of bin arms 20 extending transversely across bin sorter 10 below a bin wall 14 and connected by a torque member 15 so that they may be actuated together by a common actuator 22.

When lumber support 16 is in the position shown in FIG. 1, lumber L is confined between walls 14 on either side of bin 12A. As lumber support 16 is lowered toward the position shown in FIG. 2A, it reaches a point wherein some lumber L is below the lower edge 24 of the opposing wall 14A. Bin arms 20A prevent lumber L from spilling prematurely off of lumber support 16 under lower edge 24.

Figure 2B:
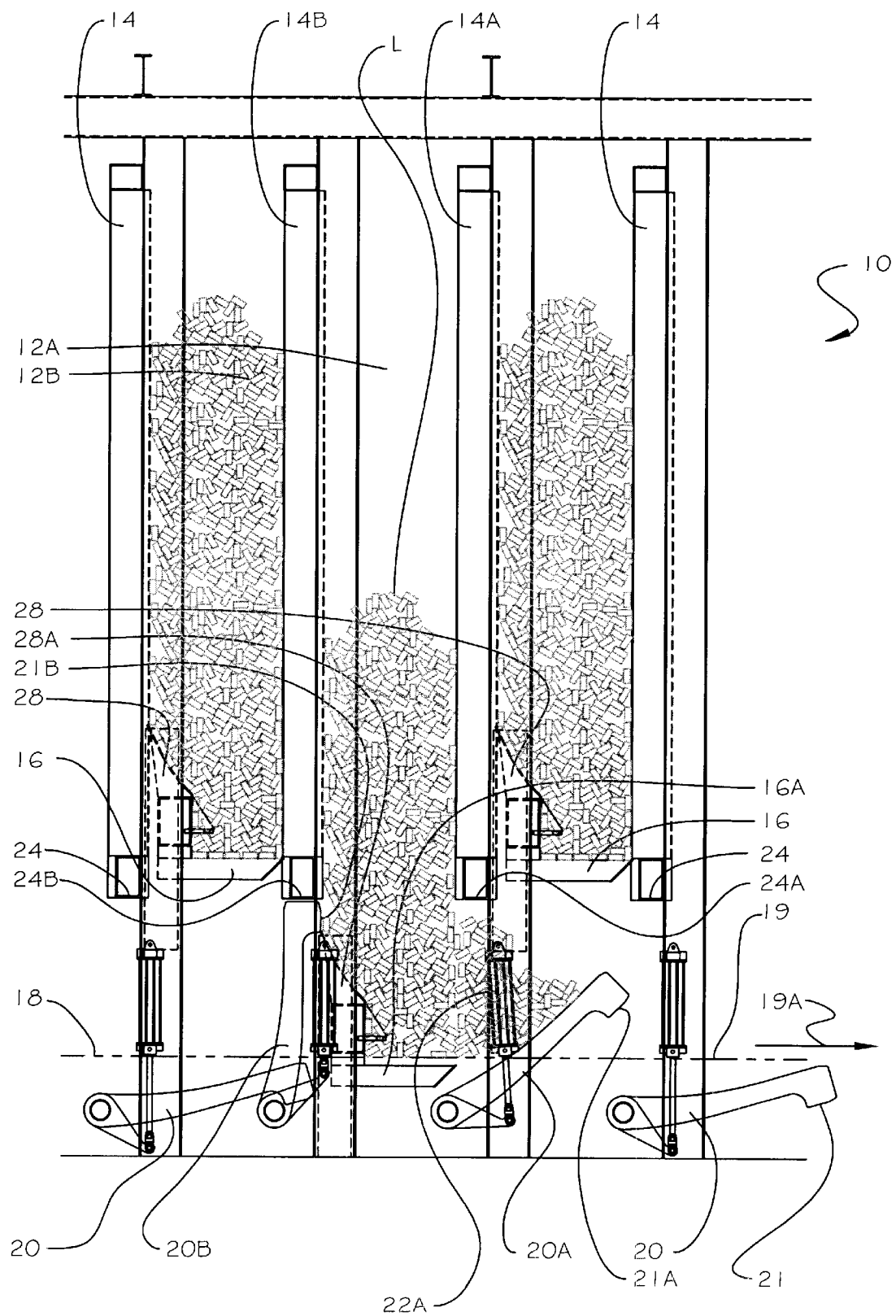
FIG. 2B is a side elevation of the lumber sorting bins of FIG. 1 in a second stage of a lumber discharge cycle.
Figure 2C:
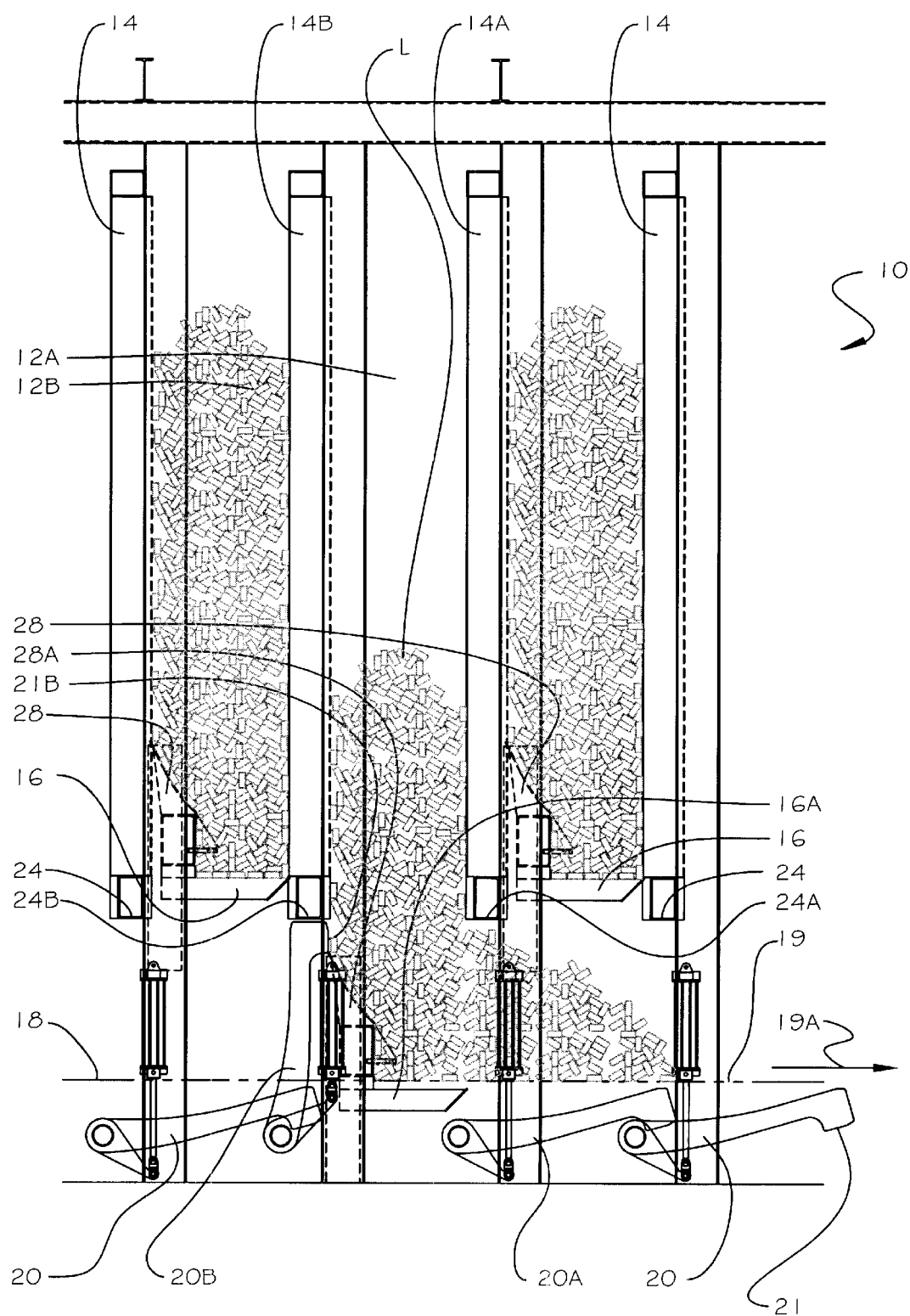
FIG. 2C is a side elevation of the lumber sorting bins of FIG. 1 in a third stage of a lumber discharge cycle.

As shown in FIG. 2B, in a preferred mode of operation, bin arms 20A below wall 14A are lowered after lumber support 16 has descended to a point where lumber L is supported by conveyor 18. Actuators 22 cause bin arms 20A to pivot in a downstream direction (i.e. in the direction of arrow 19A). As bin arms 20A pivot downwardly, bin arms 20A allow lumber L to spread onto conveyor 18 in a controlled manner. Bin arms 20A are lowered into a position in which bin arms 20A are below the top surface of conveyor 18 as shown in FIG. 2C. The sets of bin arms 20 downstream from bin 12A are also lowered. Conveyor 18 then carries lumber L from bin 12A downstream over the lowered bin arms 20A and other downstream sets of lowered bin arms 20.

In the embodiment of FIG. 1, each lumber support 16 has a back support 28. Back support 28 prevents lumber L from spilling off of the upstream side of lumber support 16 when lumber support 16 is in a position such that some lumber L is below the lower edge of upstream wall 14B.

In some embodiments, back support 28 may not be present or may be short so that when lumber support 16 is in its discharge position there is vertical clearance between the upper end of back support 28 and the lower edge of wall 14B. In such embodiments, upstream bin arms 20B may be maintained in an upright position as shown in FIGS. 2A through 2C. In the embodiment of FIGS. 2A to 2C, bin arms 20B prevent lumber L from spilling upstream off of lumber support 16. Bin arms 20B have downstream-projecting ears 21. When bin arms 20B are in their upright positions, ears 21 align generally with the downstream face of wall 14B so that lumber cannot become trapped on top of back support 28 or fall over the top of back support 28.

After conveyor 18 has carried away lumber L from bin 12A, lumber support 16 may be lifted until it is once again between bin walls 14A and 14B. More lumber may then be introduced into bin 12A.

Figure 4:
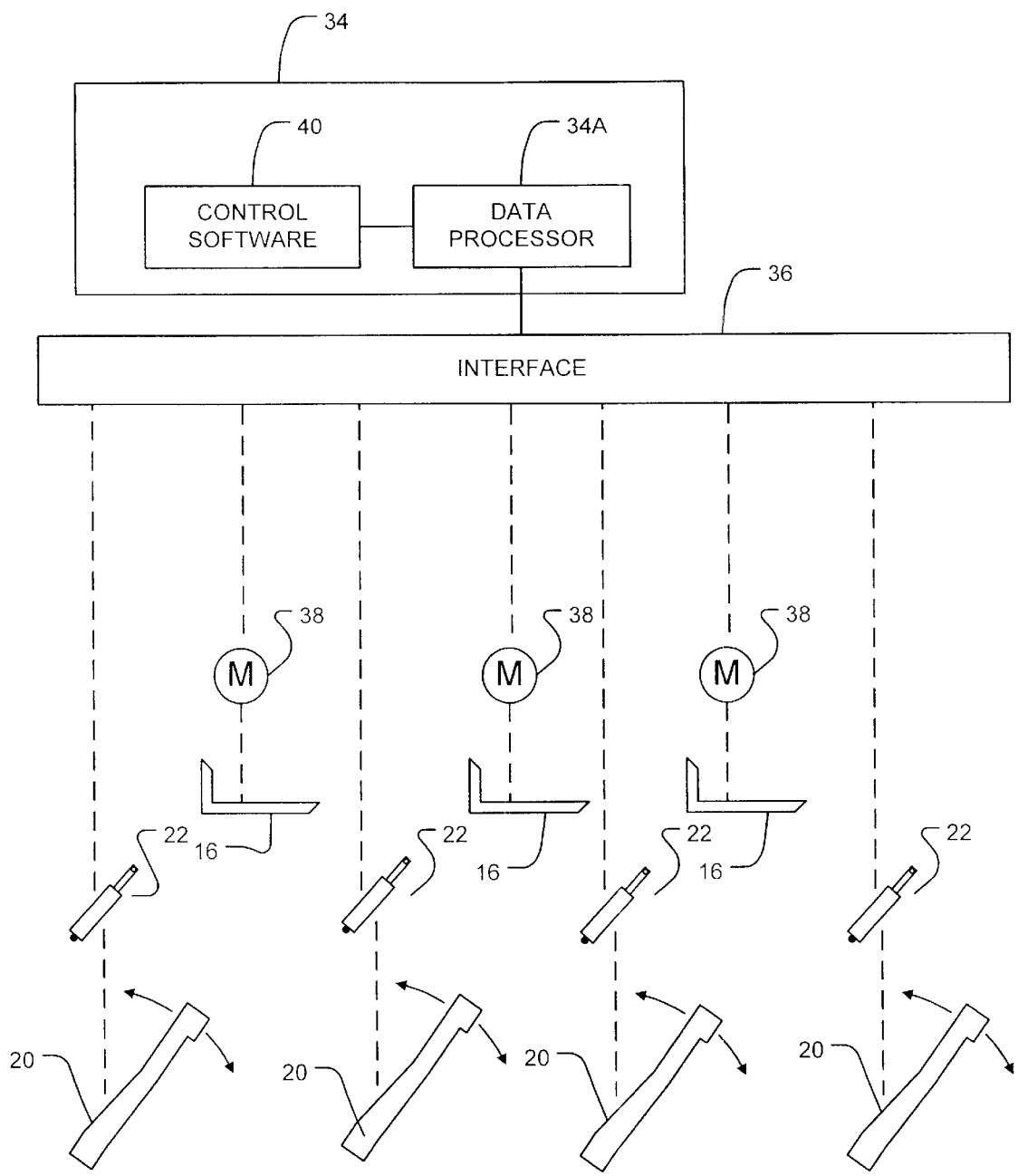
FIG. 4 is a simplified schematic diagram showing a control system for the set of sorting bins of FIG. 1.

The operation of bin sorter 10 may be coordinated by an automatic controller 34, which is indicated schematically in FIG. 4. Controller 34 may, for example, comprise a data processor 34A such as a computer, programmable controller, or the like. Controller 34 is connected by way of one or more suitable interfaces 36 interfaced to control actuators 38 which actuate the elevator mechanisms for lumber supports 16 and actuators 22 which actuate bin arms 20. Where controller 34 comprises a data processor it may also comprise software 40 which, when executed by controller 34 causes controller 34 to execute an unloading cycle as described above.

While actuators 38 have been shown as motors in FIG. 4, actuators 38 may comprise any suitable actuators including linear actuators such as pneumatic or hydraulic cylinders, motors, clutches, or the like capable of controllably elevating and lowering a lumber support 16.

Figure 5:
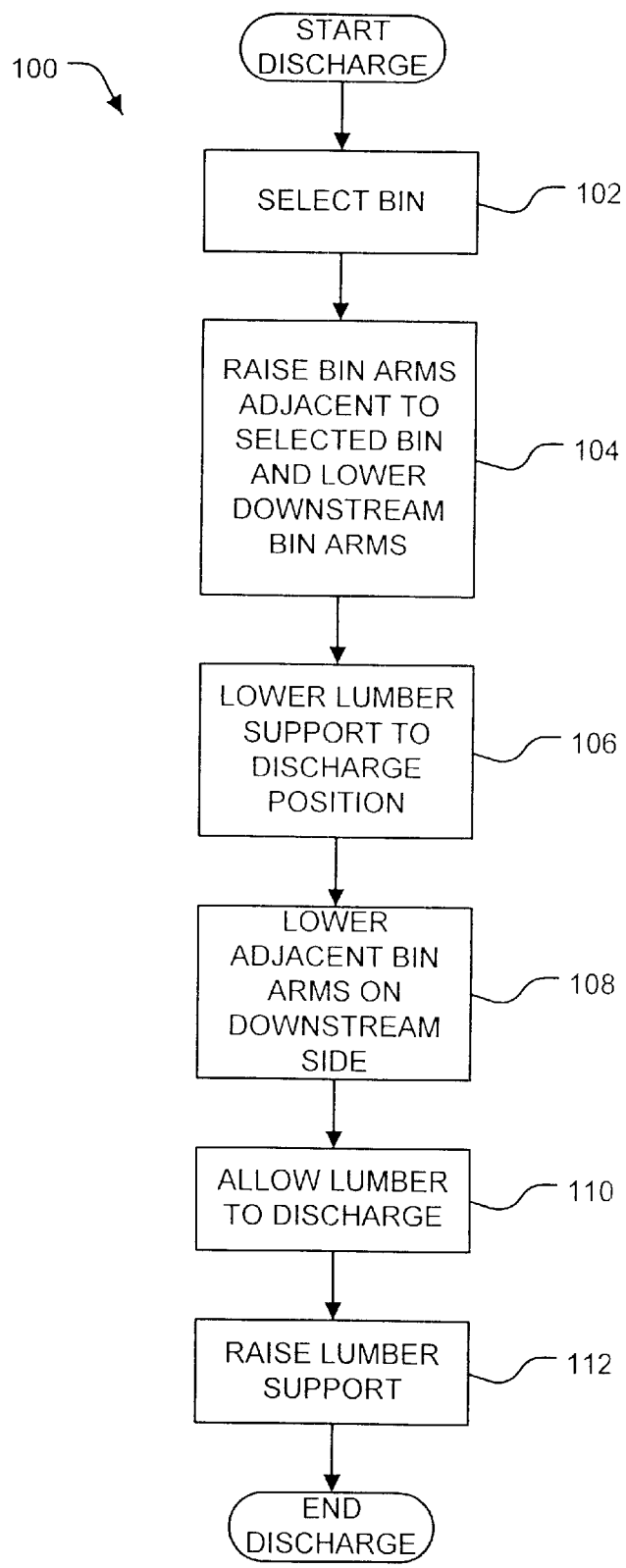
FIG. 5 is a flow chart illustrating a method for operating apparatus like that of FIG. 1 to discharge lumber from a lumber bin.

The operation of bin sorter 10 may proceed according to the lumber discharge method 100 of FIG. 5. In block 102 a bin is selected. In block 104 bin arms 20 are placed in a suitable configuration for discharging lumber from the selected bin. In the illustrated embodiment bin arms 20A and 20B adjacent a selected bin 12A are placed in their raised positions and bin arms 20 downstream from bin arms 20A are lowered. The positions of bin arms 20 upstream from bin arms 20B does not matter.

In block 106 the lumber support 16 in the selected bin is lowered into its discharge position. In block 108 the bin arms 20A on the downstream side of the selected bin are lowered to deposit lumber L onto conveyor 18. It is not necessary that bin arms 20A remain fully upright until lumber support 16 has fully reached its discharge position. Bin arms 20A could begin moving to their lowered positions while lumber support 16 is still being moved toward its discharge position.

In block 110 lumber L from the selected bin is allowed to discharge onto conveyor 18. In block 112, the lumber support 16 of the selected bin is raised to a position between walls 14A and 14B.

Figure 6:
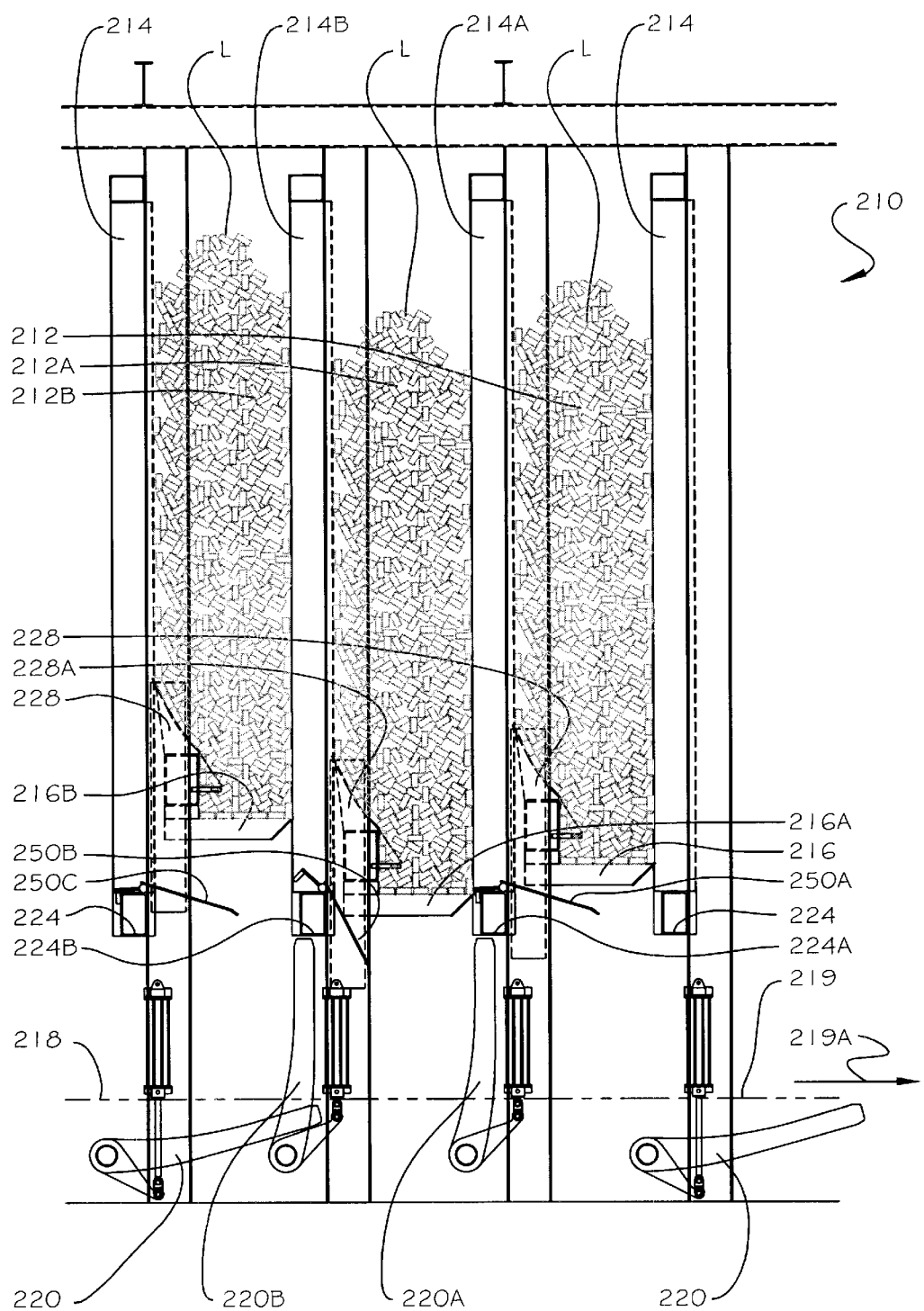
FIG. 6 is a partially schematic side elevational view of a series of lumber sorting bins according to another embodiment of the invention.

In some applications the bin geometry may not permit deployment of bin arms 20 which are long enough to reach the lower edges 24 of walls 14. In such case an additional member or members may be provided to bridge gaps between the upper ends of bin arms 20 and the lower edges of corresponding walls 14. FIG. 6 shows a series of bins 212 which include such members.

Figure 7A:
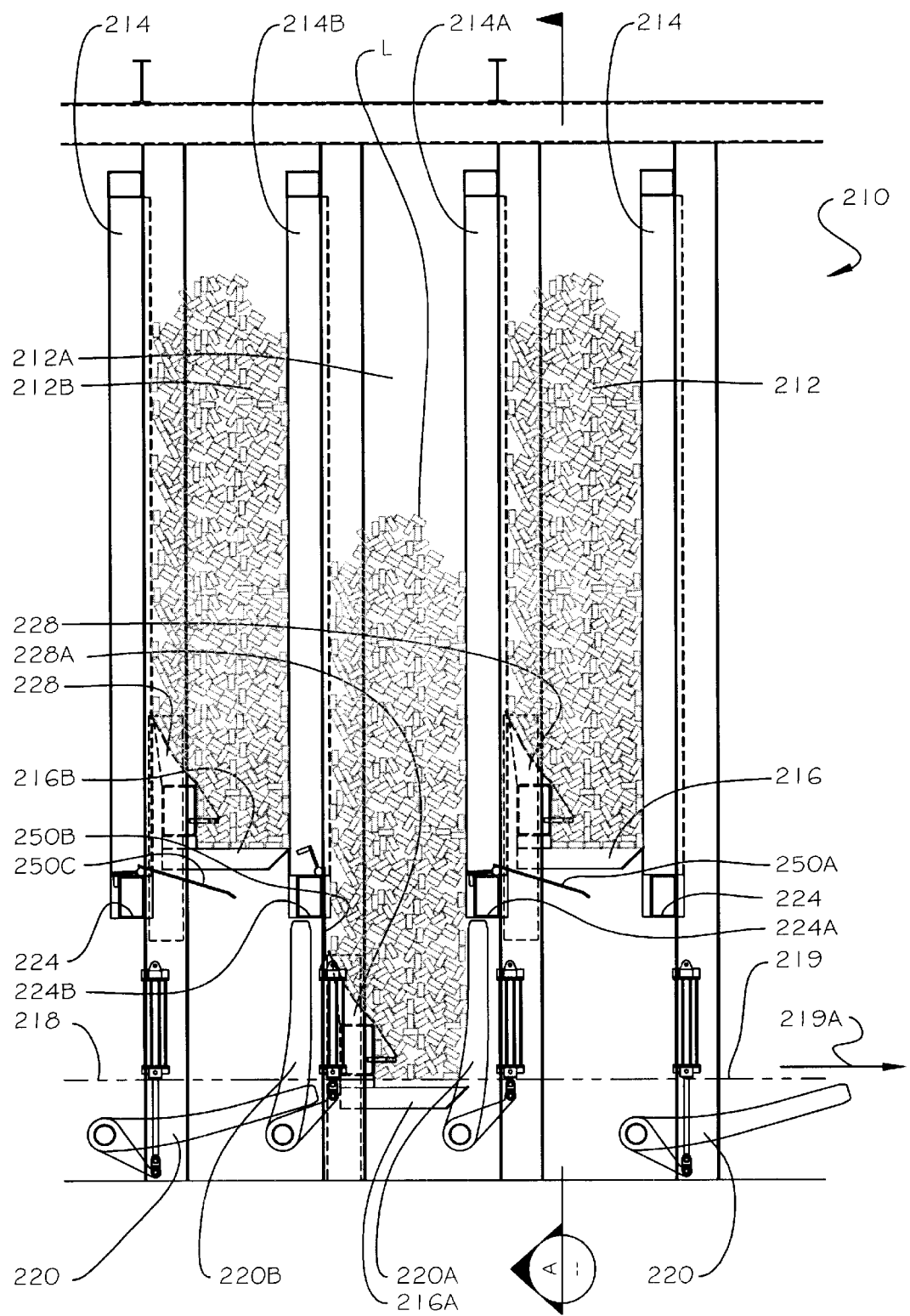
FIG. 7A is a side elevation of the lumber sorting bins of FIG. 4 in a first stage of a lumber discharge cycle.
Figure 7B:
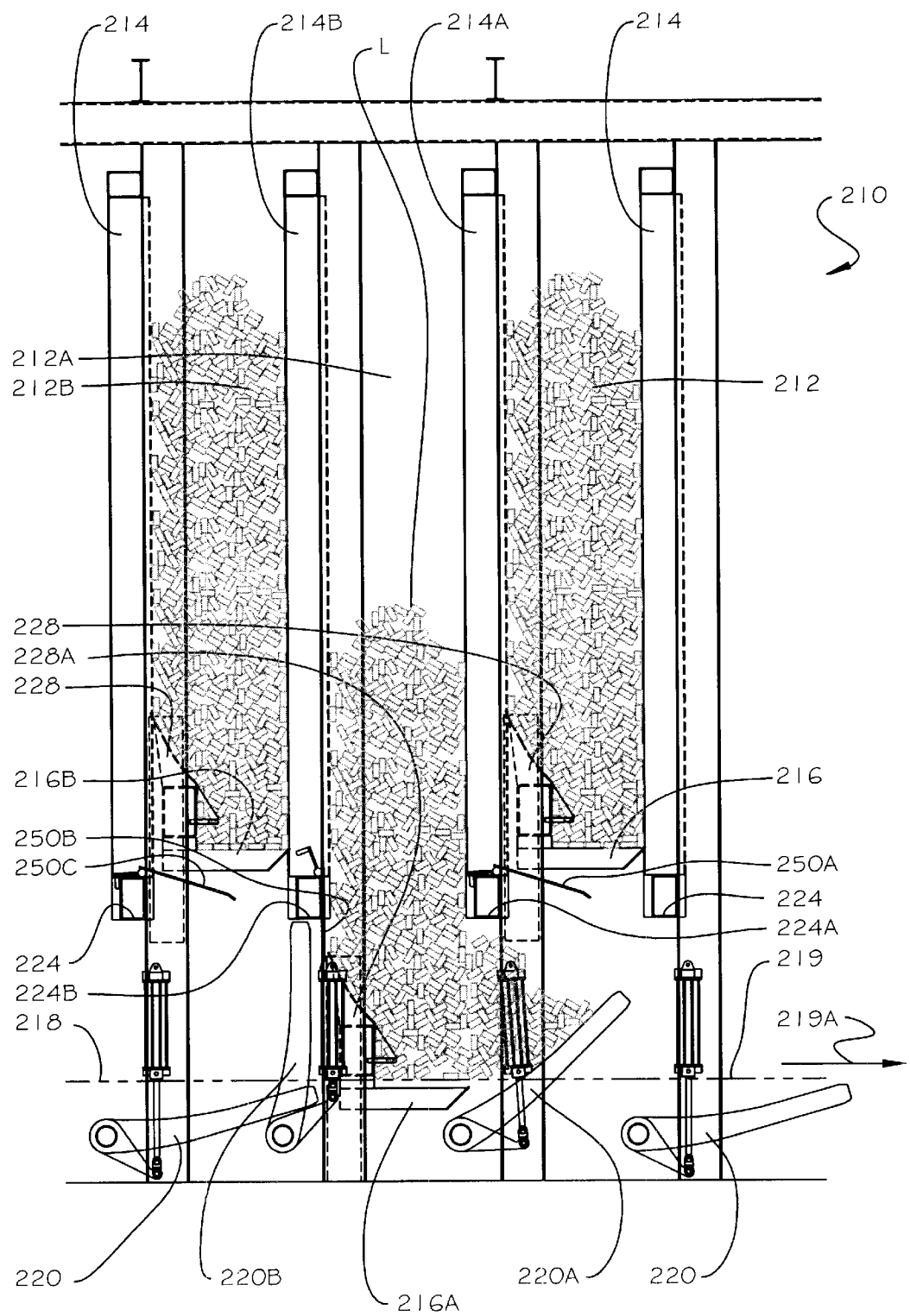
FIG. 7B is a side elevation of the lumber sorting bins of FIG. 4 in a second stage of a lumber discharge cycle; and, FIG. 7C is a side elevation of the lumber sorting bins of FIG. 4 in a third stage of a lumber discharge cycle.
Figure 7C:
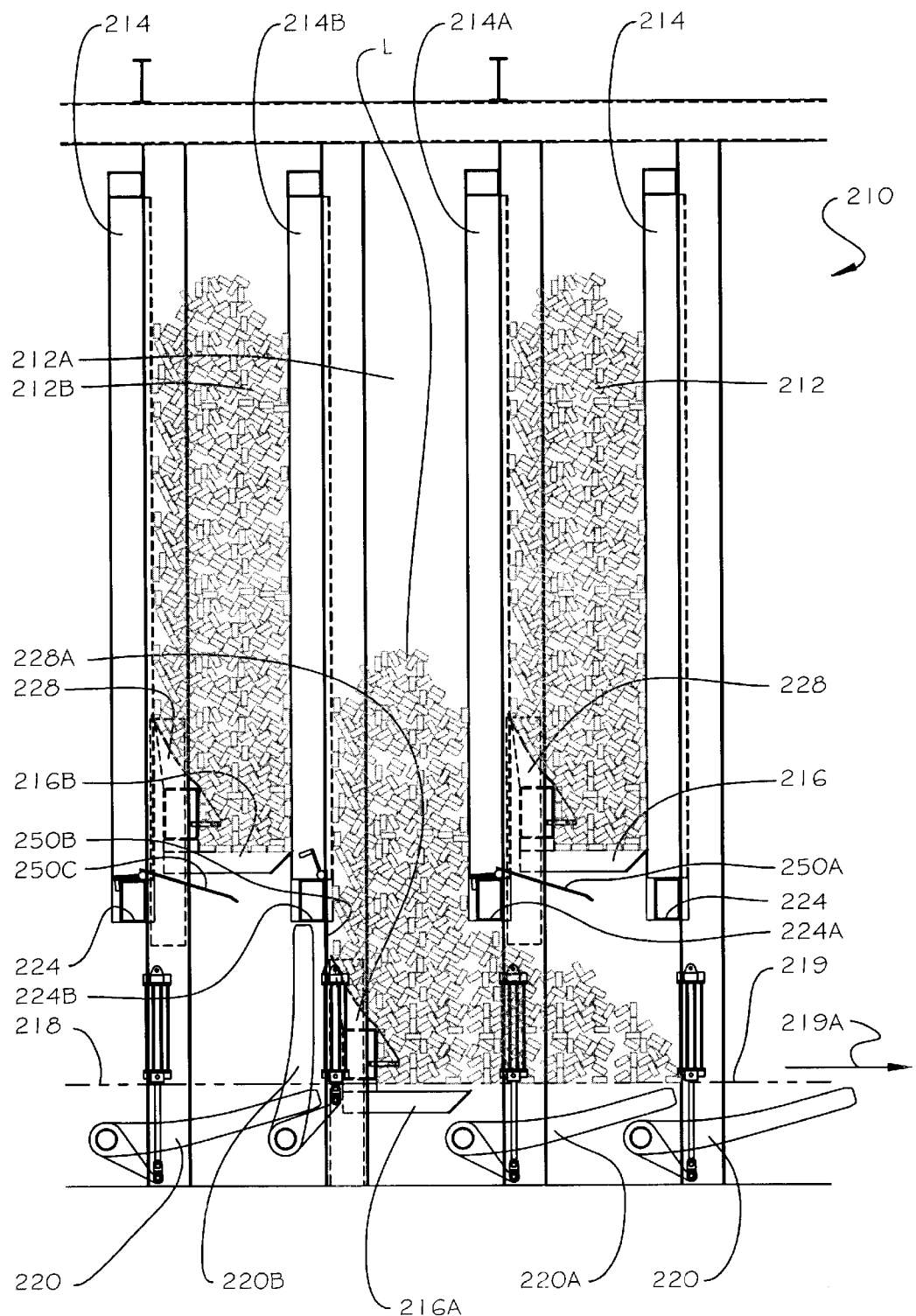
Figure 8:
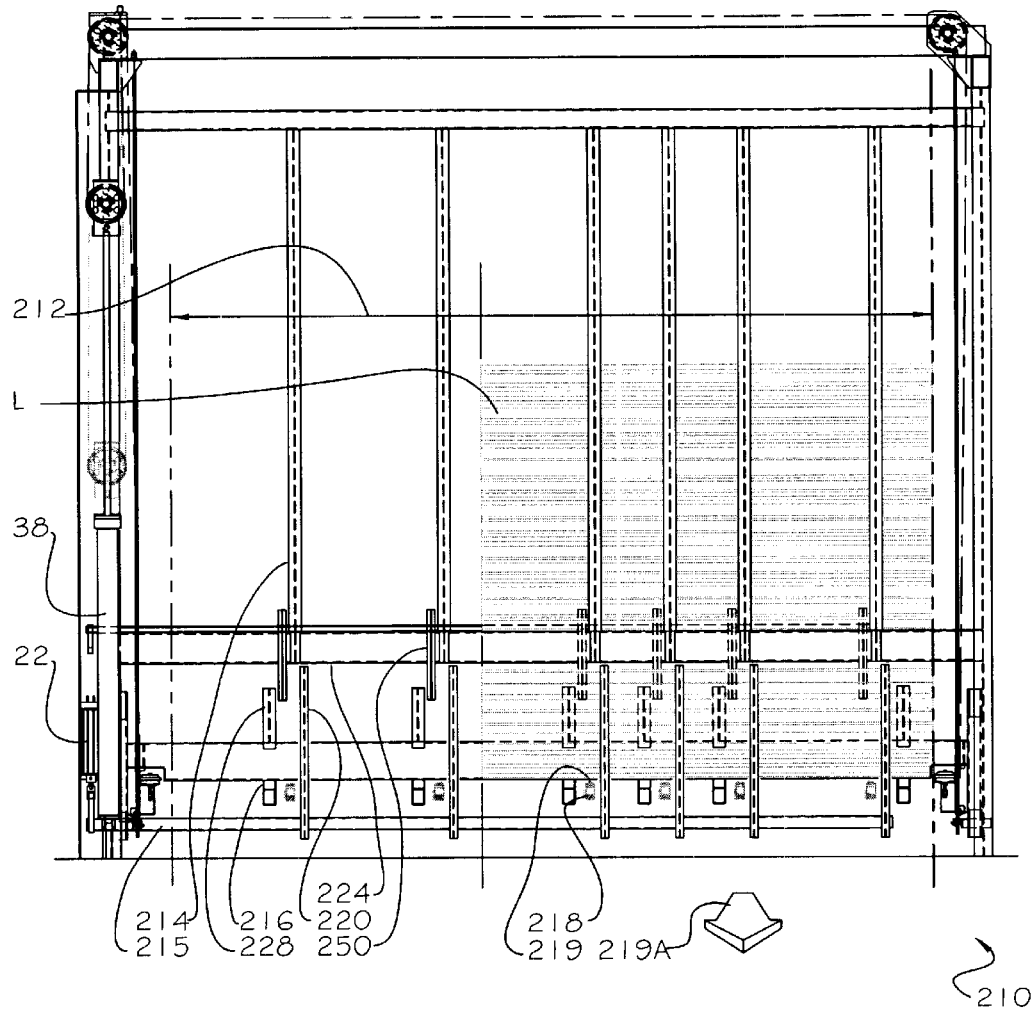
FIG. 8 is a transverse cross sectional view through a wall of one bin of the lumber sorting bins of FIG. 6.

In the embodiment of FIG. 6, bin arms 220 are too short to reach the lower ends 224 of walls 214. Bridge members 250 are pivotally mounted near the lower edges of walls 14. As shown in FIG. 7A, as a lumber support 216A in a selected bin 212A is lowered past the lower edge 224B of wall 214B, member 250 is tipped into a position wherein it projects downwardly past lower end 224B of wall 224. Bridge member 250 prevents lumber L from falling upstream through the gap 252 between the upper end of bin arm 220B and the lower end 224B of wall 214B.

Bridge member 250 may be actuated by the passage of lumber support 216. For example, member 250 may be biased by gravity, a spring, or other suitable bias mechanism so that it normally adopts a more-or-less horizontal position. The bridge member 250 of bin 212B is in such a position in FIG. 6. As lumber support 216 descends, its lower side pushes member 250 into a more-or-less vertical position. The bridge member 250 of bin 212A is shown in such a position in FIG. 7A. Bridge member 250 could also be actuated by a separate actuator. In the further alternative, bridge members 250 could simply hang downwardly in the more-or-less vertical position and swing aside when necessary to permit the passage of lumber from upstream locations.

As an alternative means for closing a gap between an upper end of a bin arm 220 and a lower end of a corresponding bin wall 214, bin arms 220 could be made extendible. For example, bin arms 220 may each have a slidably mounted bridge member that extends when bin arms 220 are in their upright positions and retracts when bin arms 220 are in their lowered position.

As a further alternative means for closing a gap between an upper end of a bin arm 220 and a lower end of a corresponding bin wall 214, bridge members could be slidably mounted at the lower ends of bin walls 214. The bridge members could be lowered to positions wherein they project below lower ends 224 of walls 214 when necessary and could be lifted upwardly by suitable actuators when not required. The bridge members could also be biased upwardly by springs, counterweights, or other suitable bias means and pushed into positions where they project below the lower ends of the bin walls 214 by lumber support 216 as it descends.

Where a component (e.g. a member, device, mechanism, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, the bins shown in the drawings have vertical walls. The bin walls do not need to be vertical but could be inclined at an angle to the vertical.

bin arms 20 and 220 have been described herein as being pivotally mounted and movable by pivoting between their upright and lowered positions. While this is preferred, the invention could be practised by providing an actuator which lowers bin arms 20 or 220 from a position wherein they project upwardly past conveyor 18 to a position wherein the bin arms are below conveyor 18 such that lumber travelling on conveyor 18 can pass over the bin arms. The bin arms could be lowered in a trajectory other than a pivoting trajectory.

bin arms 20 or 220 do not need to be shaped exactly as shown, the bin arms could have different constructions.

Accordingly, the scope of the invention is to be construed in accordance with the substance defined by the following claims.

What is claimed is:

1. Lumber handling apparatus comprising:
   upstream and downstream bin walls having lower edges;
   a conveyor extending below lower edges of the upstream and downstream bin walls, the conveyor movable in a downstream direction;
   a lumber support between the bin walls, the lumber support movable upwardly and downwardly between a first position wherein the lumber support is between the bin walls and a discharge position wherein a lumber supporting surface of the lumber support is below the lower edge of the downstream bin wall; and,
   a first gate, the first gate movable between an upright position wherein the first gate projects above the level of the conveyor to substantially block lumber from passing between the lower end of the downstream bin wall and the conveyor and a lowered position wherein the first gate is below the level of the conveyor.

2. The lumber handling apparatus of claim 1 wherein the first gate is pivotally mounted to a support for rotation about a pivot axis below the level of the conveyor.

3. The lumber handling apparatus of claim 2 wherein the first gate comprises an actuator coupled to the first gate, the actuator operative to move the first gate from the upright position to the lowered position by swinging the first gate about pivot axis so that a top end of the first gate travels generally in the downstream direction.

4. The lumber handling apparatus of claim 3 wherein the first gate comprises a plurality of transversely spaced apart bin arms connected by a transversely extending torque member.

5. The lumber handling apparatus of claim 3 wherein, when the first gate is in the upright position, the upper end of the first gate extends upwardly at least to a level of the lower end of the downstream bin wall.

6. The lumber handling apparatus of claim 3 comprising a plurality of bins, wherein adjacent pairs of the plurality of bins share a common bin wall, the common bin wall constituting the upstream bin wall of a downstream one of the bins and the downstream bin wall of an upstream one of the bins.

7. The lumber handling apparatus of claim 6 comprising a plurality of gates including the first gate, one of the plurality of gates mounted below a downstream bin wall of each of the bins.

8. The lumber handling apparatus of claim 3 comprising a second gate, the second gate movable between an upright position wherein the second gate projects above the level of the conveyor to substantially block lumber from passing between the lower end of the upstream bin wall and the conveyor and a lowered position wherein the second gate is below the level of the conveyor.

9. The lumber handling apparatus of claim 8 wherein, when the second gate is in the upright position, the upper end of the second gate is spaced below the lower end of the upstream wall by a gap and the apparatus comprises a bridging member disposed to bridge the gap.

10. The lumber handling apparatus of claim 9 wherein the bridging member is pivotally mounted to the upstream bin wall.

11. The lumber handling apparatus of claim 10 wherein, wherein the bridging member is located in a position such that, upon descending, the lumber support mechanically displaces the bridging member into a position wherein the bridging member projects downwardly past the lower end of the upstream bin wall.

12. The lumber handling apparatus of claim 9 wherein the bridging member is movably attached to the upstream bin wall.

13. The lumber handling apparatus of claim 9 wherein the bridging member is movably attached to the second gate.

14. The lumber handling apparatus of claim 1 wherein the conveyor comprises a plurality of longitudinally extending, transversely spaced apart conveyor elements and the first gate comprises a plurality of transversely spaced apart, parallel, bin arms separated by the conveyor elements.

15. The lumber handling apparatus of claim 14 wherein the plurality of bin arms are connected by a transversely extending torque member.

16. A method for operating a lumber handling apparatus comprising a bin comprising upstream and downstream bin walls, the method comprising:
   placing a quantity of lumber on a downwardly movable lumber support surface in the bin between the bin walls;
   moving a gate to an upright position wherein the gate substantially blocks a gap between a conveyor and a lower edge of the downstream bin wall;
   lowering the lumber support to a discharge position;
   moving the gate downwardly to a lowered position below a level of the conveyor; and,
   carrying the lumber on the conveyor downstream from the lumber support and over the gate.

* * * * *